United States Patent
Wakabayashi et al.

(10) Patent No.: US 9,360,602 B2
(45) Date of Patent: Jun. 7, 2016

(54) TRANSMISSION DIFFRACTION ELEMENT

(71) Applicant: Asahi Glass Company, Limited, Chiyoda-ku (JP)

(72) Inventors: Takeru Wakabayashi, Chiyoda-ku (JP); Masahiro Murakawa, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 431 days.

(21) Appl. No.: 13/832,728

(22) Filed: Mar. 15, 2013

(65) Prior Publication Data

US 2013/0250421 A1 Sep. 26, 2013

(30) Foreign Application Priority Data

Mar. 26, 2012 (JP) .................................. 2012-070442
Mar. 12, 2013 (JP) .................................. 2013-048926

(51) Int. Cl.
*G02B 5/18* (2006.01)
*G02B 5/30* (2006.01)

(52) U.S. Cl.
CPC ............ *G02B 5/1866* (2013.01); *G02B 5/3025* (2013.01)

(58) Field of Classification Search
CPC ...... G02B 5/18; G02B 5/1814; G02B 5/1866; G02B 27/4272; G02B 5/3083; G02B 5/3033; G02B 27/283; G02B 5/3025; G02B 5/30
USPC ............... 359/558–576, 483.01–494.01, 577, 359/580, 581, 583, 584, 586, 588, 589, 590, 359/350, 352, 355, 359
See application file for complete search history.

(56) References Cited

U.S. PATENT DOCUMENTS

| | | | |
|---|---|---|---|
| 5,598,300 A | 1/1997 | Magnusson et al. | |
| 7,142,363 B2 | 11/2006 | Sato et al. | |
| 7,170,600 B2 | 1/2007 | Nishii et al. | |
| 7,319,559 B2 | 1/2008 | Nakama et al. | |
| 7,502,167 B2 | 3/2009 | Shiozaki et al. | |
| 7,554,734 B1 | 6/2009 | Holm et al. | |
| 7,961,393 B2 * | 6/2011 | Perkins et al. | 359/485.05 |
| 8,165,436 B2 | 4/2012 | Mossberg et al. | |
| 8,189,259 B1 | 5/2012 | Holm et al. | |
| 2002/0040892 A1 * | 4/2002 | Koyama et al. | 219/121.69 |
| 2004/0219338 A1 * | 11/2004 | Hebrink et al. | 428/202 |
| 2005/0200957 A1 | 9/2005 | Hikichi et al. | |
| 2005/0275944 A1 * | 12/2005 | Wang et al. | 359/576 |
| 2008/0074748 A1 * | 3/2008 | Kittaka et al. | 359/576 |
| 2011/0279901 A1 * | 11/2011 | Watanabe | G02B 5/285 359/589 |

FOREIGN PATENT DOCUMENTS

JP 2008-102488 5/2008
WO WO 2004/074888 A1 9/2004

* cited by examiner

*Primary Examiner* — Scott J Sugarman
*Assistant Examiner* — Kristina Deherrera
(74) *Attorney, Agent, or Firm* — Oblon, McClelland, Maier & Neustadt, L.L.P.

(57) ABSTRACT

A transmitting diffraction element may include a transparent substrate, and a plurality of convex parts periodically formed on one surface of the transparent substrate, and be configured to diffract incident light to the transparent substrate. Each of the convex parts may include first, second, third, and fourth layers that are stacked on the transparent substrate. The first and third layers may be made of a material having a high refractive index, and the second and fourth layers may be made of a material having a low refractive index that is lower than the high refractive index.

20 Claims, 9 Drawing Sheets

TRANSMISSION DIFFRACTION ELEMENT

CROSS-REFERENCE TO RELATED APPLICATIONS

This application is based upon and claims the benefit of priority of the Japanese Patent Applications No. 2012-070442 filed on Mar. 26, 2012, and No. 2013-048926 filed on Mar. 12, 2013, the entire contents of which are incorporated herein by reference.

BACKGROUND OF THE INVENTION

1. Field of the Invention

The present invention relates to a transmission diffraction element that transmits and diffracts incident light.

2. Description of the Related Art

A device or module, such as a tunable laser, a wavelength selective switch, and an optical spectrum analyzer, may separate (or isolate) light including a plurality of wavelengths, and acquire information such as intensity, phase and the like of the light included for each wavelength. One method of separating the light may use a prism or a diffraction element. The diffraction element in particular may make a grating period short in order to make a diffraction angle difference per unit wavelength increment large.

When using the diffraction element, a plurality of diffracted light, namely, ±1st-order, ±2nd-order, ±3rd-order, . . . diffracted light, are generated. Hence, in order to compensate for the low utilization efficiency of light, the grating period of the diffraction element may be set approximately equal to or less than the wavelength of the incident light, and the incident light may be input obliquely to the direction of a normal to the diffraction element. In this case, the utilization efficiency of light may be improved by generating only the +1st-order (or −1st-order) diffracted light, as the diffracted light.

In addition, in optical communications and optical measurements, the polarization state is generally not constant, and there are demands for a diffraction element having a diffraction efficiency with no polarization dependence. Particularly in the case of a reflection diffraction element, it may be difficult to suppress the polarization dependence, and an element, such as a polarization eliminating element or the like, to compensate for the polarization dependence may be arranged in front of the diffraction element. On the other hand, in the case of the transmission diffraction element, a structure that may suppress the polarization dependence has been reduced to practice.

Examples of the diffraction element are proposed in the International Publication No. 2004/074888 and the Japanese Laid-Open Patent Publication No. 2008-102488, for example.

However, the amount of information transferred in the optical communication is increasing considerably in recent years, and for this reason, the transmission diffraction element that may be used as the diffraction element of the tunable laser and the wavelength selective switch may be required to have a high wavelength resolution, a high diffraction efficiency, and a low polarization dependence throughout the entire wavelength region of the incident light.

In order to obtain a higher wavelength resolution, it may be effective to reduce the period of the gratings of the diffraction element. However, when the period of the grating becomes less than or equal to one-half the wavelength of incident light, in principle the diffraction no longer occurs. Hence, a plurality of diffraction elements may be used, or the light may be transmitted through a single diffraction element a plurality of times, in order to increase the wavelength resolution. In such cases, because the utilization efficiency of light by the diffraction element becomes an exponential of the diffraction efficiency, a higher diffraction efficiency may be required. Hence, the utilization efficiency of light by the diffraction element greatly differs depending on the diffraction efficiency. For example, when the diffraction efficiency is 98% when the light passes through the diffraction element once, the diffraction efficiency becomes approximately 96% when the light passes through the diffraction element two times, and the diffraction efficiency becomes approximately 92% when the light passes through the diffraction element four times. On the other hand, when the diffraction efficiency is 96% when the light passes through the diffraction element once, the diffraction efficiency becomes approximately 92% when the light passes through the diffraction element two times, and the diffraction efficiency becomes approximately 85% when the light passes through the diffraction element four times.

As methods of obtaining a higher diffraction efficiency, the International Publication No. 2004/074888 and the Japanese Laid-Open Patent Publication No. 2008-102488 propose methods of adjusting the structure or cross sectional shape of grating convex parts of the diffraction element. According to these proposals, the grating convex part has a 3-layer structure, and a high diffraction efficiency may be obtained. However, in order to obtain the high diffraction efficiency, the cross sectional shape may need to be a barrel shape or the like, and it may be difficult to form the grating convex part having the barrel-shaped cross section. Another grating convex part that is proposed, having a trapezoidal cross section, may be easier to manufacture. However, the grating convex part having the trapezoidal cross section may have a narrow wavelength range in which a desired diffraction efficiency is obtainable, and a tolerable manufacturing margin at the time of the manufacture may be small. Hence, it may be difficult to obtain a high yield and a high diffraction efficiency throughout the entire wavelength region that is to be used.

In addition, as a method of obtaining a satisfactory wavelength dependence and a high diffraction efficiency the cross sectional in the structure in which the grating convex part has the trapezoidal cross section, the grating convex part may be formed to have the 3-layer structure, and the refractive index (or index of refraction) of each layer in the 3-layer structure and the refractive index of a substrate may satisfy a predetermined relationship. For example, when the refractive indexes of the layers forming the 3-layer structure respectively are $n_1$, $n_2$, and $n_3$ from the layer closest to towards the layer farthest from the substrate, the predetermined relationship may be represented by $n_s < n_1 < n_2$ and $n_3 < n_1$, where $n_s$ denotes the refractive index of the substrate. In this case, because the three (3) layers forming the 3-layer structure are made of mutually different materials, it becomes necessary to use three different kinds of materials to manufacture the 3-layer structure. In addition, a large deposition apparatus may be required to manufacture the 3-layer structure, and the manufacturing process may become complex.

On the other hand, in order to perform signal processing with a satisfactory quality in optical communication, not only a high diffraction efficiency but also reduction of reflected 1st-order diffracted light returning in the same direction as the incident light may be desired. For example, in the case of an optical system in which light emitted from an end of an optical fiber is incident to the diffraction element, when the reflected 1st-order diffracted light is reflected at the end of the optical fiber and again becomes incident to the diffraction element to act as a resonator, the signal intensity may become unstable. For example, when the diffraction efficiency of the transmitted 1st-order diffracted light is 96%, the remaining 4% are distributed to the transmitted 0th-order diffracted light (linearly transmitted light), the reflected 0th-order diffracted light (regular reflected light), and the reflected 1st-order diffracted light (diffracted light returning in the direction of the incident light). In other words, it may be seen that from the point of view of reducing the reflected 1st-order diffracted light, it may be effective to increase the diffraction efficiency of the transmitted 1st-order diffracted light.

SUMMARY OF THE INVENTION

The present invention is conceived in view of the above problem, and one object of the present invention is to provide a transmission diffraction element that may be easily manufactured at a low cost, and may have a high diffraction efficiency and a low polarization dependence throughout the entire wavelength region of incident light.

According to one aspect of the present invention, a transmitting diffraction element may include a transparent substrate; and a plurality of convex parts periodically formed on one surface of the transparent substrate, wherein the transmitting diffraction element is configured to diffract incident light to the transparent substrate, wherein each of the plurality of convex parts includes a first layer, a second layer, a third layer, and a fourth layer that are stacked on the transparent substrate, the first layer and the third layer are made of a first material having a high refractive index, and the second layer and the fourth layer are made of a second material having a low refractive index that is lower than the high refractive index.

According to one aspect of the present invention, the first material may be one material or a combination of two or more materials selected from $Si_3N_4$, $TiO_2$, $Nb_2O_5$, and $Ta_2O_5$, and the second material may be one material selected from $SiO_2$ and SiON.

According to one aspect of the present invention, the first material may have a refractive index within a range of 1.9 to 2.3 in a wavelength region of the incident light, and the second material may have a refractive index within a range of 1.4 to 1.6 in a wavelength region of the incident light.

According to one aspect of the present invention, a difference between the refractive index of the first material and a refractive index of the second material may be 0.5 or greater.

According to one aspect of the present invention, the second material may have a refractive index of 1.5 or less in a wavelength region of the incident light.

According to one aspect of the present invention, the third layer may have a thickness that is largest amongst thicknesses of the first, second, third, and fourth layers.

According to one aspect of the present invention, a sum of thicknesses of the first layer and the third layer may be greater than a sum of thicknesses of the second layer and the fourth layer.

According to one aspect of the present invention, an antireflection coating may be formed on another surface of the transparent substrate opposite to the one surface.

According to one aspect of the present invention, the antireflection coating may have a stacked structure including a fifth layer made of the first material forming the first and third layers, and a sixth layer formed by the second material forming the second and fourth layers, that are alternately stacked.

Other objects and further features of the present invention may be apparent from the following detailed description when read in conjunction with the accompanying drawings.

DESCRIPTION OF THE PREFERRED EMBODIMENTS

A detailed description will hereinafter be given of embodiments of the present invention with reference to the drawings. Those parts that are the same are designated by the same reference numerals, and a description thereof will be omitted.

[First Embodiment]

(Structure of Transmission Diffraction Element)

Figure 1:
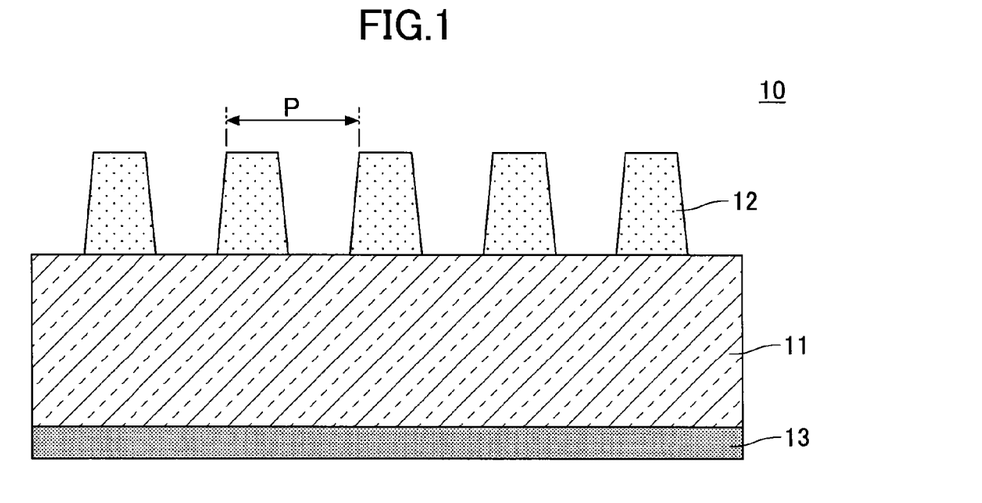
FIG. 1 is a cross sectional view schematically illustrating an example of a structure of a transmission diffraction element in a first embodiment.
Figure 2:
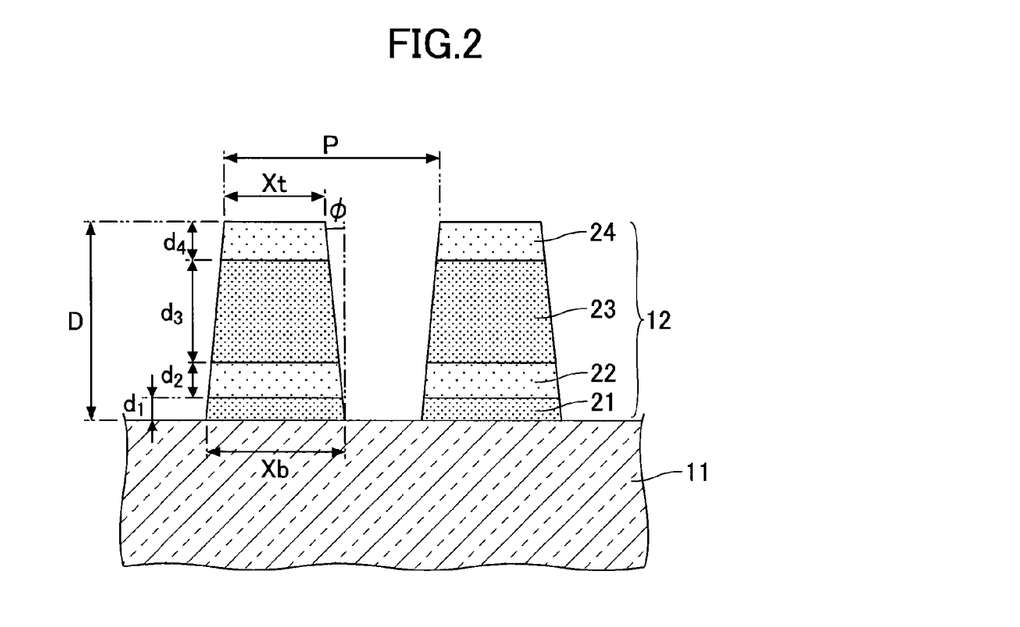
FIG. 2 is a cross sectional view schematically illustrating convex parts of the transmission diffraction element in the first embodiment.

A description will be given of a transmission diffraction element in a first embodiment. FIG. 1 is a cross sectional view schematically illustrating an example of a structure of a transmission diffraction element 10 in the first embodiment. The transmission diffraction element 10 may include concavo-convex diffraction gratings formed thereon by periodically farming convex parts 12 with a period P on one surface (that is, one side) of a transparent substrate 11. In this embodiment, the convex part 12 may have a 4-layer structure that uses two kinds of materials, namely, a material having a low refractive index (hereinafter also referred to as "low refractive index material") and a material having a high refractive index (hereinafter also referred to as "high refractive index material") that are alternately stacked, as illustrated in FIG. 2. More particularly, the convex part 12 may be formed by successively stacking on one surface of the transparent substrate 11 a first layer 21 having a thickness $d_1$ and made of the high refractive index material, a second layer 22 having a thickness $d_2$ and made of the low refractive index material, a third layer 23 having a thickness $d_3$ and made of the high refractive index material, and a fourth layer 24 having a thickness $d_4$ and made of the low refractive index material. The convex part 12 may have a trapezoidal shape having a bottom side with a length $X_b$, a top side with a length $X_t$, a height D, and sloping (or tapered) sides forming a taper angle ø with respect to a vertical to the bottom side. An anti-reflection coating (hereinafter also referred to as an "AR coating") 13 may be formed on the other surface (that is, other side) of the transparent substrate 11 on the opposite side from the one surface of the transparent substrate 11. A peripheral medium, such as air or the like, may exist in a region corresponding to a concave part between two adjacent convex parts 12.

Figure 3:
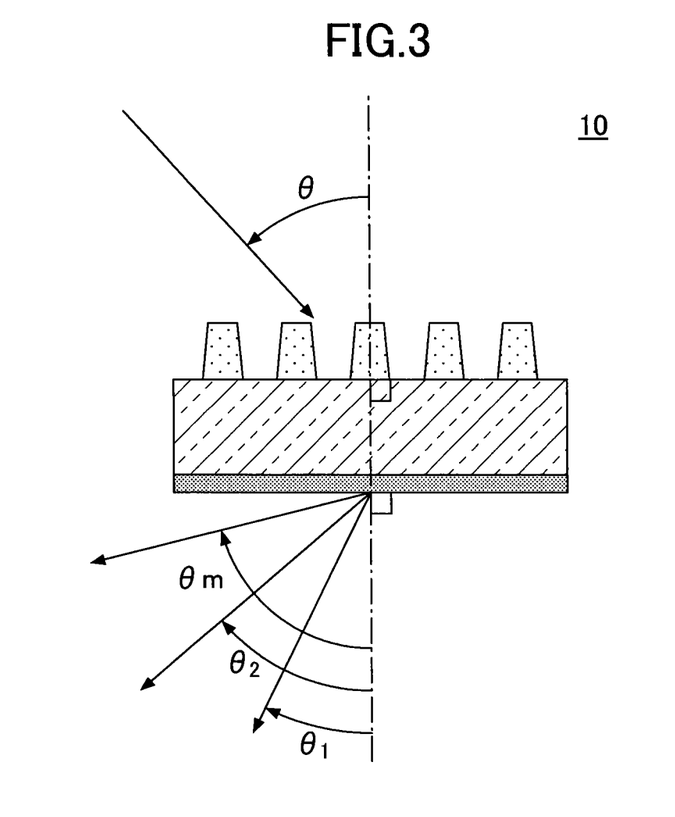
FIG. 3 is a diagram for explaining incident light and outgoing diffracted light of the transmission diffraction element.

As illustrated in FIG. 3, light becomes incident to the transmitting diffraction element 10 in this embodiment, from the side of the transmitting diffraction element 10 formed with the diffraction gratings, so that an incident angle is inclined by an angle θ with respect to a normal to one surface of the transparent substrate 11. Hence, the light is diffracted by the diffraction gratings and a plurality of diffracted light is generated thereby. Each of the generated, plurality of diffracted light may reach the side of the transparent substrate 11 opposite to the side formed with the AR coating 13. When m is an integer, mth-order diffracted light may be emitted in the direction of an emitting diffraction angle $\theta_m$ with respect to the normal to the one surface of the transparent substrate 11. In this case, the incident angle θ and the emitting diffraction angle $\theta_m$ may satisfy a relationship represented by the following formula (1). For example, an emitting diffraction angle $\theta_2$ indicates the emitting diffraction angle of the 2nd-order diffracted light.

$$\sin\theta + \sin\theta_m = \frac{m\lambda}{P} \qquad (1)$$

In order to efficiently utilize the light by the transmitting diffraction element 10 in this embodiment, it may be required to generate only the 1st-order diffracted light and not the diffracted light of the 2nd and higher orders. In other words, the grating period P and the incident angle θ may be set to satisfy a condition (2λ/P−sin θ)>1 for not generating the diffracted light of the 2nd and higher orders, with respect to a wavelength λ of the light to be used.

When the formula (1) is solved for the emitting diffraction angle $\theta_1$ of the 1st-order diffracted light, the formula (1) may be transformed into the following formula (2).

$$\theta_1 = \sin^{-1}\left(\frac{\lambda}{P} - \sin\theta\right) \qquad (2)$$

The formula (2) indicates that the emitting diffraction angle $\theta_1$ of the 1st-order diffracted light may differ depending on the wavelength λ of the incident light. The difference in the emitting diffraction angle $\theta_1$ of the 1st-order diffracted light may differ depending on the wavelength λ, that is, the resolution wavelength, may be represented by the following formula (3) which may be obtained by differentiating the formula (2) by λ. It may be seen from the formula (3) that the shorter the grating period P, the higher the wavelength resolution.

$$\frac{d\theta_1}{d\lambda} = \frac{1}{P}\frac{1}{\sqrt{1 - (\lambda/P - \sin\theta)^2}} \qquad (3)$$

(Method of Manufacturing Transmitting Diffraction Element)

Next, a description will be given of a method of manufacturing the transmitting diffraction element 10 in this embodiment. First, the first layer 21, the second layer 22, the third layer 23, and the fourth layer 24 may be successively deposited on the surface of the transparent substrate 11 by vacuum deposition, sputtering, or the like. The transparent substrate 11 may be made of silica glass, a low-expansion silica glass having a low thermal expansion, and the like. More particularly, the first layer 21 may be formed to the thickness $d_1$ from the high refractive index material, the second layer 22 may be formed to the thickness $d_2$ from the low refractive index material, the third layer 23 may be formed to the thickness $d_3$ from the high refractive index material, and the fourth layer 24 may be formed to the thickness $d_4$ from the low refractive index material. Hence, the high refractive index material and the low refractive index material are alternately stacked in a multi-layer structure that is formed on the surface of the transparent substrate 11. Dielectrics such as $Si_3N_4$, $TiO_2$, $Nb_2O_5$, $Ta_2O_5$, and the like may be used for the high refractive index material. On the other hand, dielectrics such as $SiO_2$, SiON, and the like may be used for the low refractive index material. The high refractive index material may be one material or a combination of two or more materials selected from $Si_3N_4$, $TiO_2$, $Nb_2O_5$, and $Ta_2O_5$, and the low refractive index material may be one material selected from $SiO_2$ and SiON.

In this embodiment, one kind of high refractive index material and one kind of low refractive index material, that is, a total of two kinds of material may be selected, in order to minimize the number of deposition sources or sputtering targets and enable manufacturing of the multi-layer structure using simple manufacturing facilities. In this case, the conditions and the like at the time of the deposition may also be reduced, and a stable film deposition may be performed without making the manufacturing process complex. More particularly, when using a sputtering apparatus to deposit the first layer 21, the second layer 22, the third layer 23, and the fourth layer 24 in this embodiment, the sputtering apparatus need only accommodate two kinds of targets. Accordingly, compared to the conventional case in which three or more layers are formed using three or more kinds of materials, this embodiment may manufacture the transmitting diffraction element using manufacturing facilities that are simpler. Further, because the manufacturing process does not become complex in this embodiment, the transmitting diffraction element may be manufactured at a low cost.

In this embodiment, the high refractive index material may refer to a material preferably having a refractive index within a range of 1.9 to 2.3 with respect to the wavelength of the light to be used. On the other hand, the low refractive index material may refer to a material preferably having a refractive index within a range of 1.4 to 1.6 with respect to the wavelength of the light to be used. In addition, the difference between the refractive indexes of the high refractive index material and the low refractive index material may preferably be 0.5 or greater. Furthermore, the refractive index of the low refractive index material may preferably be 1.5 or less due to the difference with the refractive index of air and the like. In order to obtain a satisfactory characteristic, the thickness of the third layer 23 may preferably be greater than the thickness of each of the first layer 21, the second layer 22, and the fourth layer 24. A sum of the thicknesses of the first layer 21 and the third layer 23 that are high refractive index layers may preferably be greater than a sum of the thicknesses of the second layer 22 and the fourth layer 24 that are low refractive index layers. The above findings are based on studies and experimentations conducted by the present inventor.

Next, the convex parts 12 are formed from the 4-layer structure formed on the one surface of the transparent substrate 11. More particularly, a photoresist is coated on the fourth layer 24, the photoresist is exposed by an exposure apparatus, and the exposed photoresist is developed in order to form resist patterns (not illustrated) in regions where the convex parts 12 are to be formed. Thereafter, the fourth layer 24, the third layer 23, the second layer 22, and the first layer 21 are removed by dry etching in regions where no resist patterns are formed, in order to foil the convex parts 12 and thereby form the diffraction gratings by the periodic concavo-convex parts. In this state, the convex part 12 has the 4-layer structure, and a peripheral medium (air) exists in a region between the adjacent convex parts 12, corresponding to a space forming a concave part.

When the dry etching is performed, an under-etching state may occur in which the etching ends before a desired etching stop position is reached, or an over-etching state may occur in which the etching extends deeper than the desired etching stop position. More particularly, a thin film of the first layer 21 may remain in the under-etching state, while a portion of the transparent substrate 11 may be etched in the over-etching state. These under-etching state and over-etching state may affect, to a certain extent, the characteristic of the transmitting diffraction element that is formed. Hence, tolerable values for the under-etching and the over-etching may be important from the point of view of the manufacturing margin and the like.

Shape parameters of the convex part 12 may include the thicknesses of each of the layers of the 4-layer structure, that is, the thickness $d_1$ of the first layer 21, the thickness $d_2$ of the second layer 22, the thickness $d_3$ of the third layer 23, and the thickness $d_4$ of the fourth layer 24, the taper angle ø, the length $X_b$ of the bottom side, and the length $X_t$ of the top side. These shape parameters may be optimized by design so that the diffraction efficiency becomes high with respect to the wavelength λ and the incident angle θ of the incident light to the transmitting diffraction element 10 and the grating period P, without being dependent on the polarization. The designed diffraction efficiency may preferably be 98% or higher with respect to both the S-polarization and the P-polarization in the wavelength region of the incident light, by taking into consideration the deterioration caused by inconsistencies that may be introduced during the manufacturing process.

In order to realize the shape of the convex part 12 described above, it is assumed that various conditions related to the aperture of the photomask, exposure, developing conditions and the like used in the photolithography process, various conditions related to etchant gas used in the dry etching process, and various apparatus dependent conditions are appropriately adjusted.

The AR coating 13 is deposited on the other surface of the transparent substrate 11, opposite from the one surface formed with the convex parts 12. The process of forming the AR coating 13 may be performed before or after the 4-layer structure for forming the convex parts 12 is formed, or after the convex parts 12 are formed.

The AR coating 13 that is deposited is optimized by design so that the reflectance of the S-polarization and P-polarization components is approximately 0% with respect to each of the wavelengths, by taking into consideration the different directions of outgoing light depending on the wavelength, that is, the different angles of the diffracted light incident to the AR coating 13 depending on the wavelength. In a case in which the transparent substrate 11 is formed by a parallel plate, a wavelength deviation (or ripple) of the diffraction efficiency may be generated by interference caused by multiple reflection occurring between the surface of the parallel plate deposited with the AR coating 13 and the surface of the parallel plate formed with the diffraction grating. For this reason, the reflectance of the AR coating 13 may preferably be 0.5% or less, and more preferably 0.2% or less.

Examples of the method of depositing the AR coating 13 include vapor deposition, sputtering, and the like. In addition, examples of a material forming the AR coating 13 may include dielectrics such as $SiO_2$, $SiON$, $Si_3N_4$, $TiO_2$, $Nb_2O_5$, $Ta_2O_5$, and the like. More particularly, a high refractive index material and a low refractive index material may respectively be selected from these dielectrics, and the high refractive index material and the low refractive index material may be alternately stacked in order to form the AR coating 13. In addition, when using the transmitting diffraction element 10 for optical communication, the AR coating 13 may be formed using Si, which is transparent in the wavelength region of the light that is used and is a high refractive index material. Particularly when the combination of the materials used to form the AR coating 13 is the same as the combination of the materials used for the convex parts 12, the manufacturing process and the like may be simplified, and may be preferable in that the transmitting diffraction element 10 may be manufactured at a low cost.

[Second Embodiment]
(Structure of Transmitting Diffraction Element)

Figure 4:
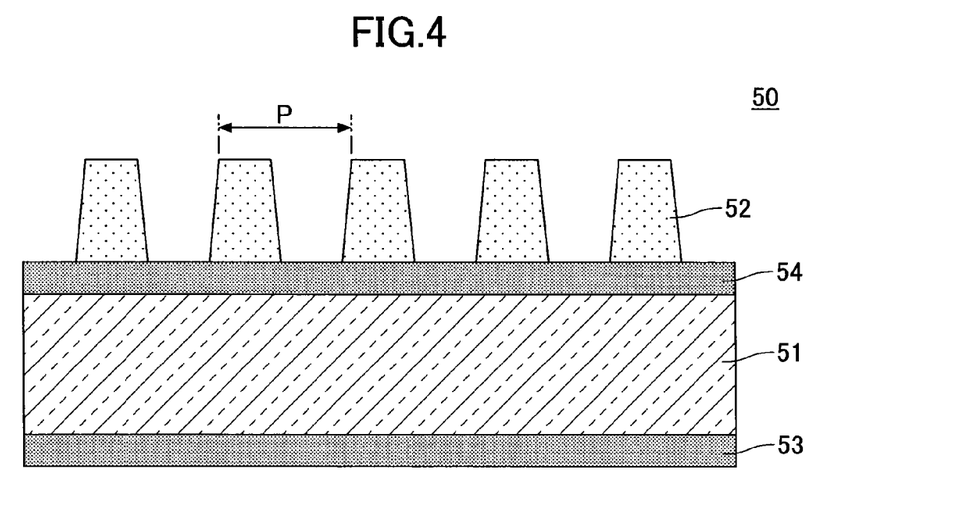
FIG. 4 is a cross sectional view schematically illustrating an example of a structure of the transmission diffraction element in a second embodiment.

Next, a description will be given of the transmitting diffraction element in a second embodiment. FIG. 4 is a cross sectional view schematically illustrating an example of a structure of a transmission diffraction element 50 in the second embodiment. An AR coating 53 may be formed on one surface of a transparent substrate 51, and a warp adjusting layer 54 may be formed on the other surface of the transparent substrate 51 opposite to the one surface. In this embodiment, the warp adjusting layer 54 may cancel a warp in the transparent substrate 51 caused by the AR coating 53. When a material selected for the warp adjusting layer 54 has a refractive index with a difference that is within ±0.1 from the refractive index of the transparent substrate 51, it may be preferable in that virtually no deterioration occurs in the optical characteristic. In addition, when the silica glass or the low-expansion silica glass is used for the transparent substrate 51, dielectric materials such as $SiO_2$ and $SiON$ may be used for the warp adjusting layer 54. The thickness of the warp adjusting layer 54 may be 0.5 to 1.5 times the thickness of the AR coating 53, and may be appropriately adjusted based on the amount of warp in the transmitting diffraction element 50. When the thickness of the warp adjusting layer 54 is less than 0.5 times the thickness of the AR coating 53, or greater than 1.5 times the thickness of the AR coating 53, it may be difficult to cancel the warp. In this embodiment, in a case in which tensile stress is generated in the AR coating 53, the warp adjusting layer 54 may be formed to also generate tensile stress therein. In addition, in a case in which compressive stress is generated in the AR coating 53, the warp adjusting layer 54 may be formed to also generate compressive stress therein.

Figure 5:
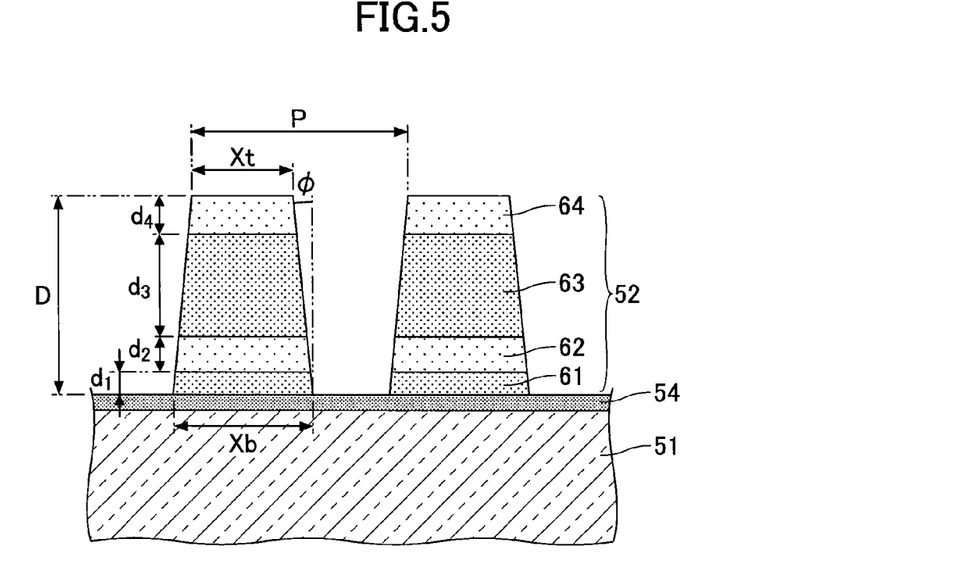
FIG. 5 is a cross sectional view schematically illustrating convex parts of the transmission diffraction element in the second embodiment.

Convex parts 52 may be formed periodically on the warp adjusting layer 54 with a period P, in order to form concavo-convex diffraction gratings. In this embodiment, the convex parts 52 may have a 4-layer structure that uses two kinds of materials, namely, a low refractive index material and high refractive index material that are alternately stacked, as illustrated in FIG. 5. More particularly, the convex part 52 may be formed by successively stacking on the warp adjusting layer 54 that is formed on the other surface of the transparent substrate 51 a first layer 61 having a thickness $d_1$ and made of the high refractive index material, a second layer 62 having a thickness $d_2$ and made of the low refractive index material, a third layer 63 having a thickness $d_3$ and made of the high refractive index material, and a fourth layer 64 having a thickness $d_4$ and made of the low refractive index material. Hence, the transmitting diffraction element 50 in this embodiment may have a structure in which the warp adjusting layer 54 is formed between the transparent substrate 51 and the convex parts 52. The structure, shape, material, and manufacturing method of the convex parts 52 illustrated in FIG. 5 may be the same as those of the first embodiment described above.

PRACTICAL EXAMPLES

Practical Example 1

First, a description will be given of the transmitting diffraction element of a practical example 1 according to the first embodiment. The transmitting diffraction element 10 of this practical example 1 has the cross sectional structure illustrated in FIG. 1, and the diffraction gratings are formed by forming the convex parts 12 with a period of 1040 nm on the transparent substrate 11 having the AR coating 13 formed thereon. In the transmitting diffraction element 10 of this practical example 1, light having a wavelength of 1525 nm to 1575 nm is incident at an angle of 48° with respect to a normal to the surface formed with the convex parts 12.

The convex parts 12 in this practical example 1 has the 4-layer structure formed by the first layer 21, the second layer 22, the third layer 23, and the fourth layer 24. More particularly, the convex part 12 in this practical example 1 has the first layer 21 made of a high refractive index material, $Ta_2O_5$, having a refractive index of 2.11 and a thickness of 40 nm, the second layer 22 made of a low refractive index material, $SiO_2$, having a refractive index of 1.46 and a thickness of 140 nm, the third layer 23 made of the high refractive index material, $Ta_2O_5$, having the refractive index of 2.11 and a thickness of 1140 nm, and the fourth layer 24 made of the low refractive index material, $SiO_2$, having the refractive index of 1.46 and a thickness of 310 nm that are stacked on the transparent substrate 11 in this order as illustrated schematically in FIG. 2. The convex parts 12 that are formed have the trapezoidal cross section. Table 1 indicate shape parameters of the convex part 12 of this practical example 1. In other words, in this practical example 1, the height D of the convex part 12, which is the sum of the thicknesses of the first layer 21, the second layer 22, the third layer 23, and the fourth layer 24, is 1630 nm, the taper angle ø is 3°, the length $X_b$ of the bottom side is 688.6 nm, and the length $X_t$ of the top side is 517.8 nm.

TABLE 1

| Substrate Side | | Practical Example 1 |
|---|---|---|
| Thickness (nm) of First Layer (High Refractive Index Layer) | $d_1$ | 40 |
| Thickness (nm) of Second Layer (Low Refractive Index Layer) | $d_2$ | 140 |
| Thickness (nm) of Third Layer (High Refractive Index Layer) | $d_3$ | 1140 |
| Thickness (nm) of Fourth Layer (Low Refractive Index Layer) | $d_4$ | 310 |
| Height (nm) | D | 1630 |
| Taper Angle (°) | ø | 3 |
| Length of Bottom Side | $X_b$ | 688.6 |
| Length of Top side | $X_t$ | 517.8 |

The transmitting diffraction element 10 in this practical example 1 may be formed by the manufacturing method described above in conjunction with the first embodiment. Silica glass having a thickness of 0.6 mm and a refractive index of 1.44 is used as the transparent substrate 11, and the $Ta_2O_5$ layer having the thickness $d_1$=40 nm and formed as the first layer 21, the $SiO_2$ layer having the thickness $d_2$=140 nm and formed as the second layer 22, the $Ta_2O_5$ layer having the thickness $d_3$=1140 nm and formed as the third layer 23, the $SiO_2$ layer having the thickness $d_4$=310 nm and formed as the fourth layer 24 are successively deposited on the one surface of the transparent substrate 11 in this order, using a sputtering apparatus.

Next, a photoresist is coated on the fourth layer 24, the photoresist is exposed by an exposure apparatus, and the exposed photoresist is developed in order to form grating-shaped resist patterns (not illustrated) having a period of 1040 nm in regions where the convex parts 12 are to be formed. Thereafter, the fourth layer 24, the third layer 23, the second layer 22, and the first layer 21 are removed by dry etching in regions where no resist patterns are formed, in order to form the convex parts 12. Thereafter, the resist patterns (not illustrated) are removed by an organic solvent or the like.

Next, the AR coating 13 is formed on the other surface of the transparent substrate 11, on the opposite side from the one surface formed with the convex parts 12. The AR coating 13 is formed using the same materials, $Ta_2O_5$ and $SiO_2$, used to form the convex parts 12, by alternately stacking the high refractive index material and the low refractive index materials by sputtering.

The AR coating 13 is designed so that light having a wavelength of 1525 nm is diffracted by the diffraction gratings faulted by the convex parts 12 and the outgoing angle (angle with respect to a normal to the surface formed with the reflection presenting layer 13) from the surface of the AR coating 13 of the transparent substrate 11 is 46.3°, and similarly, the outgoing angle is 47.9° for light having a wavelength of 1545 nm, and the outgoing angle is 50.5° for light having a wavelength of 1575 nm. That is, the AR coating 13 is designed so that the reflectances of the S-polarized and P-polarized components respectively are 0.2% or less with respect to each of the wavelengths of light, by taking into consideration the different outgoing angles of the light from the transparent substrate 11 depending on the wavelength.

Figure 6:
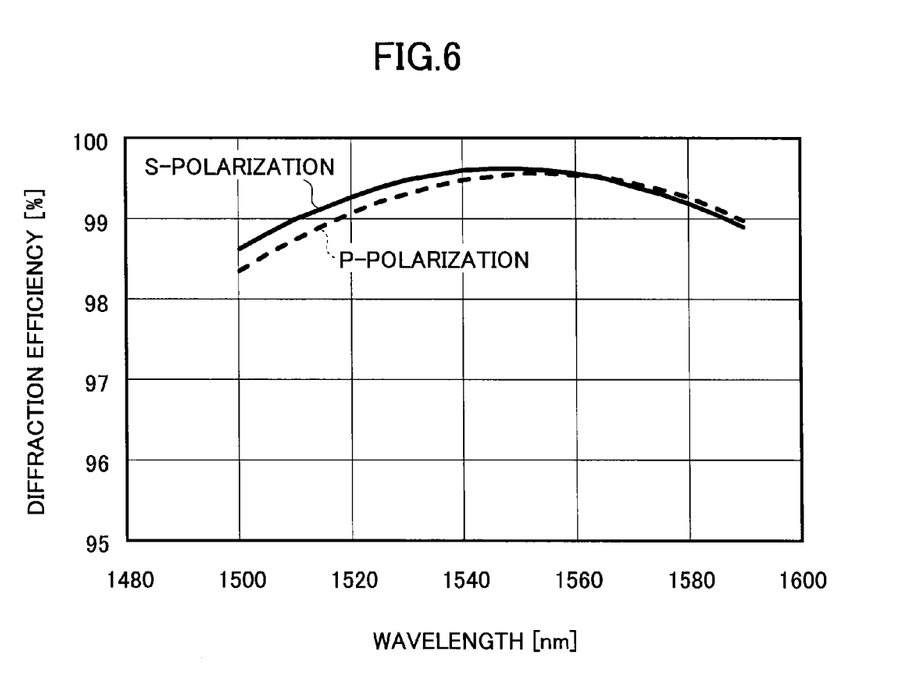
FIG. 6 is a diagram illustrating a diffraction efficiency of the transmission diffraction element in a practical example 1.

FIG. 6 is a graph illustrating a diffraction efficiency of transmitted 1st-order diffracted light of the transmission diffraction element 10 in this practical example 1. In the graph illustrated in FIG. 6, the abscissa indicates the wavelength of the incident light, and the ordinate indicates the diffraction efficiency. In a range of 1525 nm to 1575 nm of the wavelength region used, the characteristic is satisfactory in that the diffraction efficiencies of the S-polarization indicated by a solid line and the P-polarization indicated by a dotted line are both 99% or higher, and a difference between the diffraction efficiencies of the S-polarization and the P-polarization is 0.5% or less. In addition, even when the range of the wavelength region is extended to 1500 nm to 1590 nm, the diffraction efficiencies of the S-polarization and the P-polarization are both 98% or higher. Hence, it may be regarded that the formed convex parts 12 are substantially unaffected by errors from the designed values, and that the tolerable manufacturing margin is large.

In addition, in the range of 1525 nm to 1575 nm of the wavelength region used, the diffraction efficiency of the reflected 1st-order diffracted light is 0.4% or less for both the S-polarization and the P-polarization, and is smaller than that of the incident light by two digits.

When the light is incident to the transmitting diffraction element 10 from an oblique direction, a plane including an optical path of the incident light and a normal to the surface on which the convex parts 12 of the transmitting diffraction element 10 are formed may be defined as an incident plane. In this case, the polarized component oscillating in a direction perpendicular to the incident plane may be defined as the S-polarization, and the polarized component oscillating on the incident plane may be defined as the P-polarization.

Next, a description will be given of the effects on the diffraction efficiency of the transmitting diffraction element 10 of this practical example 1, in the under-etching state in which a thin portion of the first layer 21 of the 4-layer structure remains at the bottom of the grating concave parts after performing the dry etching, and in the over-etching state in which not only the 4-layer structure but also a portion of the transparent substrate 11 is removed after performing the dry etching.

Figure 7A:
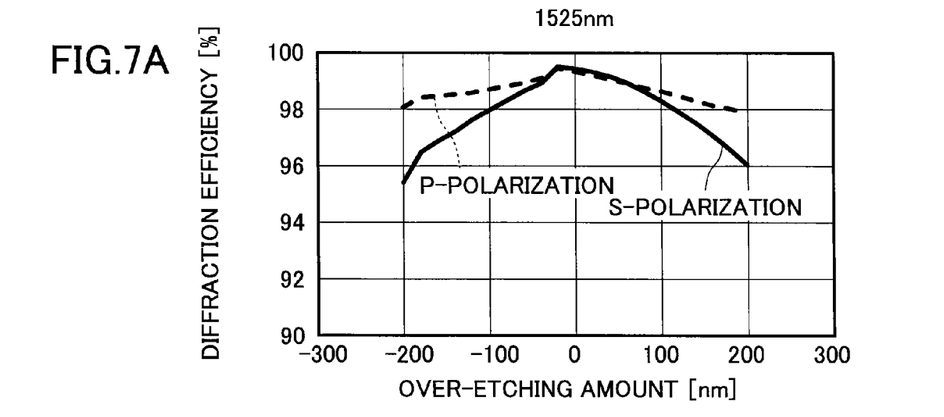
FIGS. 7A, 7B, and 7C are diagrams illustrating over-etching amounts of the transmission diffraction elements in the practical example 1.
Figure 7B:
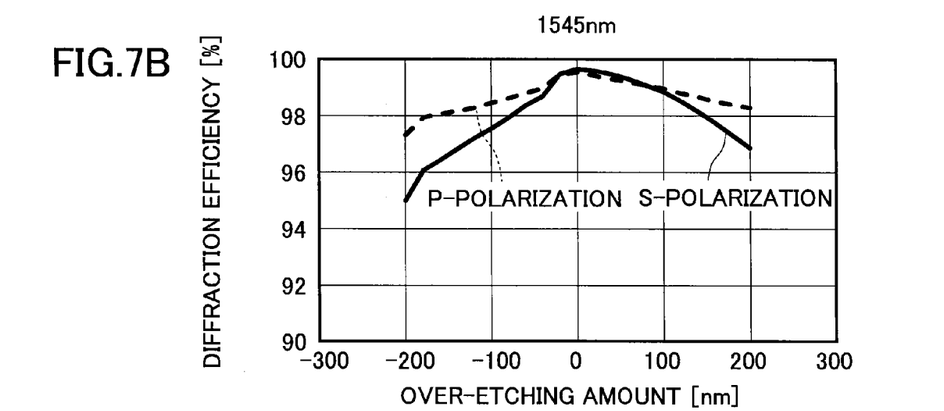
Figure 7C:
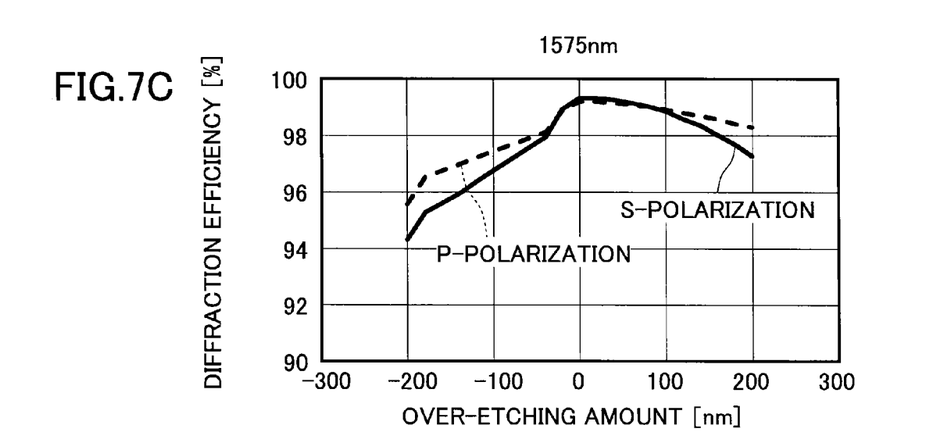

FIGS. 7A, 7B, and 7C are graphs illustrating the effects on the diffraction efficiency in the over-etching state and the under-etching state. In FIGS. 7A, 7B, and 7C, the abscissa indicates the over-etching amount, and the ordinate indicates the diffraction efficiency. In the abscissa indicating the over-etching amount, a positive value indicates the over-etching state, and a negative value indicates the under-etching state. FIG. 7A is a graph illustrating results with respect to light having the wavelength of 1525 nm, FIG. 7B is a graph illustrating results with respect to light having the wavelength of 1545 nm, and FIG. 7C is a graph illustrating results with respect to light having the wavelength of 1575 nm.

Based on FIGS. 7A, 7B, and 7C, the diffraction efficiencies of the S-polarization and the P-polarization may both be maintained to 98% or higher, when the over-etching within 100 nm is tolerated and the under-etching within 40 nm is tolerated. Furthermore, the tolerable ranges of the over-etching and the under-etching may be extended when the diffraction efficiency to be maintained may be lowered. Accordingly, the tolerable values for the over-etching and the under-etching may be appropriately set depending on the usage of the transmitting diffraction element 10. In this practical example 1, the tolerable values for the over-etching and the under-etching are set so that the diffraction efficiency may be maintained to 98% or higher.

As described above, the transmitting diffraction element 10 of this practical example 1 may have a high diffraction efficiency and a low polarization dependence. In addition, because the convex parts 12 forming the diffraction grating may be formed by the 4-layer structure that is formed by alternately stacking two kinds of materials, the transmitting diffraction element 10 may be manufactured by a simple manufacturing process and the like.

Practical Example 2

Next, a description will be given of the transmitting diffraction element of a practical example 2 according to the first embodiment. The transmitting diffraction element 10 of this practical example 2 has the cross sectional structure illustrated in FIG. 1, and the diffraction gratings are formed by forming the convex parts 12 with a period of 1070 nm on the transparent substrate 11 having the AR coating 13 formed thereon. In the transmitting diffraction element 10 of this practical example 2, light having a wavelength of 1570 nm to 1610 nm is incident at an angle of 48° with respect to a normal to the surface formed with the convex parts 12.

The convex parts 12 in this practical example 2 has the 4-layer structure formed by the first layer 21, the second layer 22, the third layer 23, and the fourth layer 24. More particularly, the convex part 12 in this practical example 2 has the first layer 21 made of a high refractive index material, $Ta_2O_5$, having a refractive index of 2.11 and a thickness of 60 nm, the second layer 22 made of a low refractive index material, $SiO_2$, having a refractive index of 1.46 and a thickness of 120 nm, the third layer 23 made of the high refractive index material, $Ta_2O_5$, having the refractive index of 2.11 and a thickness of 1160 nm, and the fourth layer 24 made of the low refractive index material, $SiO_2$, having the refractive index of 1.46 and a thickness of 340 nm that are stacked on the transparent substrate 11 in this order as illustrated schematically in FIG. 2. The convex parts 12 that are formed have the trapezoidal cross section. Table 2 indicate shape parameters of the convex part 12 in this practical example 2. In other words, in this practical example 2, the height D of the convex part 12, which is the sum of the thicknesses of the first layer 21, the second layer 22, the third layer 23, and the fourth layer 24, is 1680 nm, the taper angle ø is 3°, the length $X_b$ of the bottom side is 730 nm, and the length $X_t$ of the top side is 554 nm.

TABLE 2

| Substrate Side | | Practical Example 2 |
|---|---|---|
| Thickness (nm) of First Layer (High Refractive Index Layer) | $d_1$ | 60 |
| Thickness (nm) of Second Layer (Low Refractive Index Layer) | $d_2$ | 120 |
| Thickness (nm) of Third Layer (High Refractive Index Layer) | $d_3$ | 1160 |
| Thickness (nm) of Fourth Layer (Low Refractive Index Layer) | $d_4$ | 340 |
| Height (nm) | D | 1680 |
| Taper Angle (°) | ø | 3 |
| Length of Bottom Side | $X_b$ | 730 |
| Length of Top side | $X_t$ | 554 |

The transmitting diffraction element 10 in this practical example 2 may be formed by the manufacturing method described above in conjunction with the first embodiment. Silica glass having a thickness of 2.0 mm and a refractive index of 1.44 is used as the transparent substrate 11, and the $Ta_2O_5$ layer having the thickness $d_1$=60 nm and formed as the first layer 21, the $SiO_2$ layer having the thickness $d_2$=120 nm and formed as the second layer 22, the $Ta_2O_5$ layer having the thickness $d_3$=1160 nm and formed as the third layer 23, the $SiO_2$ layer having the thickness $d_4$=340 nm and formed as the fourth layer 24 are successively deposited on the one surface of the transparent substrate 11 in this order, using a sputtering apparatus. Next, a photoresist is coated on the fourth layer 24, the photoresist is exposed by an exposure apparatus, and the exposed photoresist is developed in order to form grating-shaped resist patterns (not illustrated) having a period of 1070 nm in regions where the convex parts 12 are to be formed. Thereafter, the fourth layer 24, the third layer 23, the second layer 22, and the first layer 21 are removed by dry etching in regions where no resist patterns are formed, in order to form the convex parts 12. Thereafter, the resist patterns (not illustrated) are removed by an organic solvent or the like.

Next, the AR coating 13 is formed on the other surface of the transparent substrate 11, on the opposite side from the one surface formed with the convex parts 12. The AR coating 13 is formed using the same materials, $Ta_2O_5$ and $SiO_2$, used to form the convex parts 12, by alternately stacking the high refractive index material and the low refractive index materials by sputtering.

The AR coating 13 is designed so that light having a wavelength of 1570 nm is diffracted by the diffraction gratings formed by the convex parts 12 and the outgoing angle (angle with respect to a normal to the surface formed with the reflection presenting layer 13) from the surface of the AR coating 13 of the transparent substrate 11 is 46.4°, and similarly, the outgoing angle is 48.0° for light having a wavelength of 1590 nm, and the outgoing angle is 49.6° for light having a wavelength of 1610 nm. That is, the AR coating 13 is designed so that the reflectances of the S-polarized and P-polarized components respectively are 0.2% or less with respect to each of the wavelengths of light, by taking into consideration the different outgoing angles of the light from the transparent substrate 11 depending on the wavelength.

Figure 8:
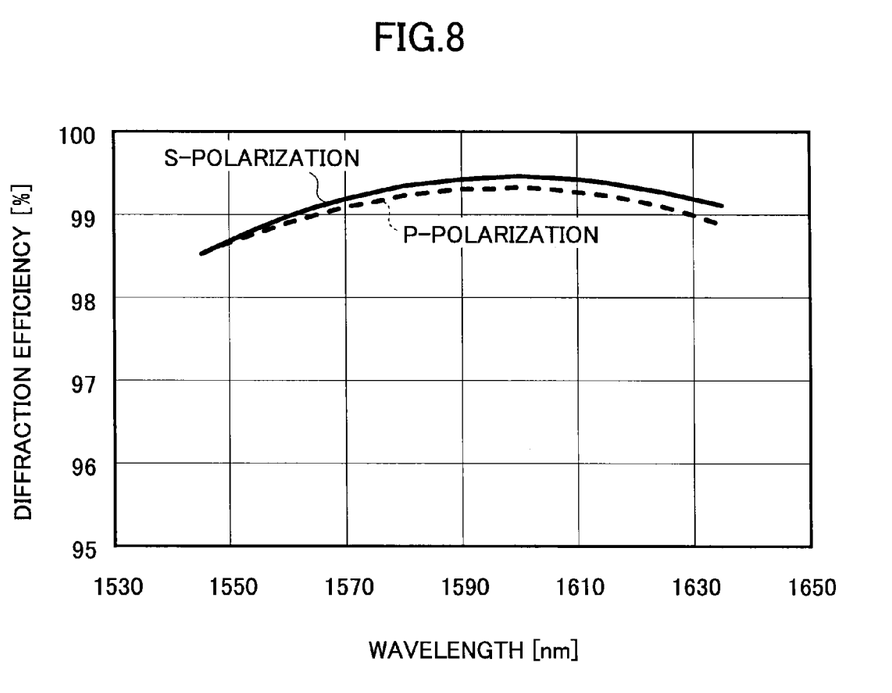
FIG. 8 is a diagram illustrating the diffraction efficiency of the transmission diffraction element in a practical example 2.

FIG. 8 is a graph illustrating a diffraction efficiency of transmitted 1st-order diffracted light of the transmission diffraction element 10 in this practical example 2. In the graph illustrated in FIG. 8, the abscissa indicates the wavelength of the incident light, and the ordinate indicates the diffraction efficiency. In a range of 1570 nm to 1610 nm of the wavelength region used, the characteristic is satisfactory in that the diffraction efficiencies of the S-polarization indicated by a solid line and the P-polarization indicated by a dotted line are both 98.5% or higher, and a difference between the diffraction efficiencies of the S-polarization and the P-polarization is 0.5% or less. In addition, even when the range of the wavelength region is extended to 1545 nm to 1635 nm, the diffraction efficiencies of the S-polarization and the P-polarization are both 98% or higher. Hence, it may be regarded that the formed convex parts 12 are substantially unaffected by errors from the designed values, and that the tolerable manufacturing margin is large.

In addition, in the range of 1570 nm to 1610 nm of the wavelength region used, the diffraction efficiency of the reflected 1st-order diffracted light is 0.2% or less for the S-polarization and is 0.6% or less for the P-polarization, and is smaller than that of the incident light by two digits.

Next, a description will be given of the effects on the diffraction efficiency of the transmitting diffraction element 10 of this practical example 2, in the under-etching state in which a thin portion of the first layer 21 of the 4-layer structure remains at the bottom of the grating concave parts after performing the dry etching, and in the over-etching state in which not only the 4-layer structure but also a portion of the transparent substrate 11 is removed after performing the dry etching.

Figure 9A:
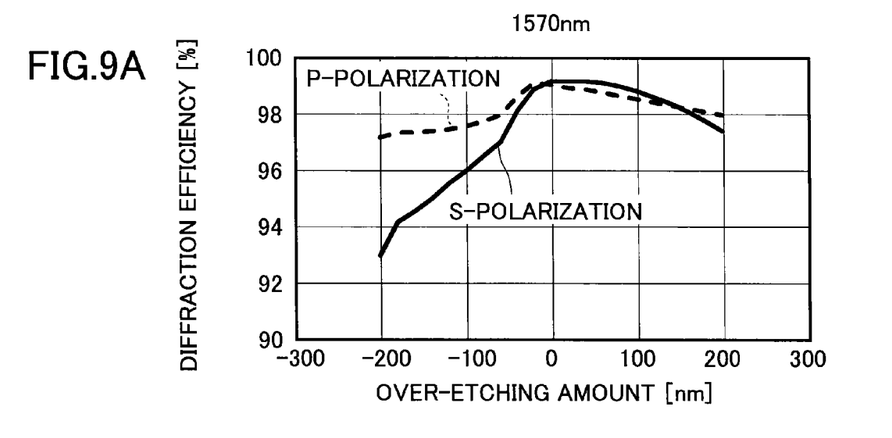
FIGS. 9A, 9B, and 9C are diagrams illustrating the over-etching amounts of the transmission diffraction elements in the practical example 2.
Figure 9B:
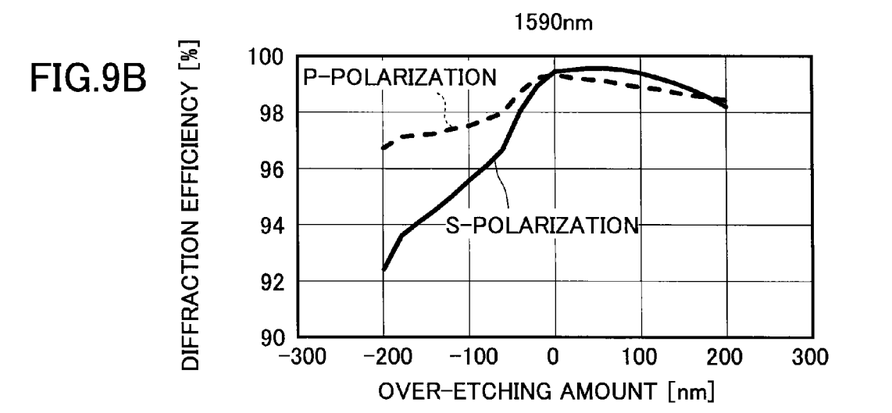
Figure 9C:
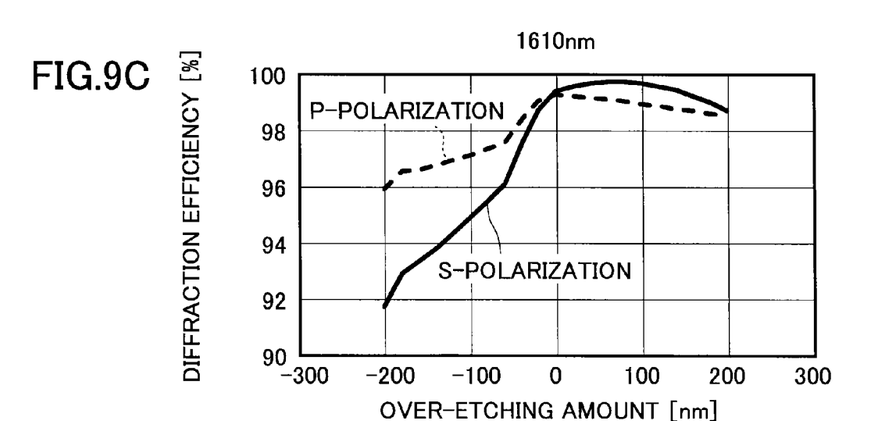

FIGS. 9A, 9B, and 9C are graphs illustrating the effects on the diffraction efficiency in the over-etching state and the under-etching state. In FIGS. 9A, 9B, and 9C, the abscissa indicates the over-etching amount, and the ordinate indicates the diffraction efficiency. In the abscissa indicating the over-etching amount, a positive value indicates the over-etching state, and a negative value indicates the under-etching state. FIG. 9A is a graph illustrating results with respect to light having the wavelength of 1570 nm, FIG. 9B is a graph illustrating results with respect to light having the wavelength of 1590 nm, and FIG. 9C is a graph illustrating results with respect to light having the wavelength of 1610 nm.

Based on FIGS. 9A, 9B, and 9C, the diffraction efficiencies of the S-polarization and the P-polarization may both be maintained to 98% or higher, when the over-etching within 160 nm is tolerated and the under-etching within 30 nm is tolerated. Furthermore, the tolerable ranges of the over-etching and the under-etching may be extended when the diffraction efficiency to be maintained may be lowered. Accordingly, the tolerable values for the over-etching and the under-etching may be appropriately set depending on the usage of the transmitting diffraction element 10. In this practical example 2, the tolerable values for the over-etching and the under-etching are set so that the diffraction efficiency may be maintained to 98% or higher.

As described above, the transmitting diffraction element 10 of this practical example 2 may have a high diffraction efficiency and a low polarization dependence. In addition, because the convex parts 12 forming the diffraction grating may be formed by the 4-layer structure that is formed by alternately stacking two kinds of materials, the transmitting diffraction element 10 may be manufactured by a simple manufacturing process and the like.

Practical Example 3

Next, a description will be given of the transmitting diffraction element of a practical example 3 according to the second embodiment. The transmitting diffraction element 50 of this practical example 3 has the cross sectional structure illustrated in FIG. 4, and the AR coating 53 is formed on one surface of the transparent substrate 51, and the warp adjusting layer 54 is formed on the other surface of the transparent substrate 51 opposite to the one surface. In addition, the diffraction gratings are formed by forming the convex parts 52 with a period of 1040 nm on the warp adjusting layer 54. In the transmitting diffraction element 50 of this practical example 3, light having a wavelength of 1525 nm to 1575 nm is incident at an angle of 48° with respect to a normal to the surface formed with the convex parts 52.

The convex parts 52 in this practical example 3 has the 4-layer structure formed by the first layer 61, the second layer 62, the third layer 63, and the fourth layer 64. More particularly, the convex part 52 in this practical example 3 has the first layer 61 made of a high refractive index material, $Ta_2O_5$, having a refractive index of 2.11 and a thickness of 40 nm, the second layer 62 made of a low refractive index material, $SiO_2$, having a refractive index of 1.46 and a thickness of 140 nm, the third layer 63 made of the high refractive index material, $Ta_2O_5$, having the refractive index of 2.11 and a thickness of 1140 nm, and the fourth layer 64 made of the low refractive index material, $SiO_2$, having the refractive index of 1.46 and a thickness of 310 nm that are stacked on the warp adjusting layer 54 formed on the transparent substrate 51 in this order as illustrated schematically in FIG. 5. The convex parts 52 that are formed have the trapezoidal cross section. Table 3 indicate shape parameters of the convex part 52 in this practical example 3. In other words, in this practical example 3, the height D of the convex part 52, which is the sum of the thicknesses of the first layer 61, the second layer 62, the third layer 63, and the fourth layer 64, is 1630 nm, the taper angle ø is 3°, the length $X_b$ of the bottom side is 688.6 nm, and the length $X_t$ of the top side is 517.8 nm.

TABLE 3

| Substrate Side | | Practical Example 3 |
|---|---|---|
| Thickness (nm) of First Layer (High Refractive Index Layer) | $d_1$ | 40 |
| Thickness (nm) of Second Layer (Low Refractive Index Layer) | $d_2$ | 140 |
| Thickness (nm) of Third Layer (High Refractive Index Layer) | $d_3$ | 1140 |
| Thickness (nm) of Fourth Layer (Low Refractive Index Layer) | $d_4$ | 310 |
| Height (nm) | D | 1630 |
| Taper Angle (°) | ø | 3 |
| Length of Bottom Side | $X_b$ | 688.6 |
| Length of Top side | $X_t$ | 517.8 |

The transmitting diffraction element 50 in this practical example 3 may be formed by the manufacturing method described above in conjunction with the second embodiment. Silica glass having a thickness of 0.6 mm and a refractive index of 1.44 is used as the transparent substrate 51, and the AR coating 53 is formed on one surface of the transparent substrate 51 by alternately depositing $SiO_2$ and $Ta_2O_5$ by a sputtering apparatus. In addition, the warp adjusting layer 54 is formed on the other surface of the transparent substrate 51 by depositing $SiO_2$ by a sputtering apparatus.

The AR coating 53 is designed so that light having a wavelength of 1525 nm is diffracted by the diffraction gratings formed by the convex parts 52 and the outgoing angle (angle with respect to a normal to the surface formed with the reflection presenting layer 53) from the surface of the AR coating 53 of the transparent substrate 51 is 46.3°, and similarly, the outgoing angle is 47.9° for light having a wavelength of 1545 nm, and the outgoing angle is 50.5° for light having a wavelength of 1575 nm. That is, the AR coating 53 is designed so that the reflectances of the S-polarized and P-polarized components respectively are 0.2% or less with respect to each of the wavelengths of light, by taking into consideration the different outgoing angles of the light from the transparent substrate 51 depending on the wavelength.

Next, the warp adjusting layer 54 made of $SiO_2$ is formed on the other surface of the transparent substrate 51 to the thickness that is 0.6 times the thickness of the AR coating 53. Thereafter, the $Ta_2O_5$ layer having the thickness $d_1$=40 nm and formed as the first layer 61, the $SiO_2$ layer having the thickness $d_2$=140 nm and formed as the second layer 62, the $Ta_2O_5$ layer having the thickness $d_3$=1140 nm and formed as the third layer 63, the $SiO_2$ layer having the thickness $d_4$=310 nm and formed as the fourth layer 64 are successively deposited on the warp adjusting layer 54 in this order, using a sputtering apparatus.

Next, a photoresist is coated on the fourth layer 64, the photoresist is exposed by an exposure apparatus, and the exposed photoresist is developed in order to form grating-shaped resist patterns (not illustrated) having a period of 1040 nm in regions where the convex parts 52 are to be formed. Thereafter, the fourth layer 64, the third layer 63, the second layer 62, and the first layer 61 are removed by dry etching in regions where no resist patterns are formed, in order to form the convex parts 52. Thereafter, the resist patterns (not illustrated) are removed by an organic solvent or the like.

The transmitting diffraction element 50 that is formed in the manner described above has a radius of curvature exceeding 30 m, and the warp is small. By appropriately adjusting the thickness of the warp adjusting layer 54, the radius of curvature of the transmitting diffraction element 50 may be larger, in order to make the warp smaller.

The diffraction efficiency of the transmitted 1st-order diffracted light of the transmitting diffraction element 50 of this practical example 3 may be similar to the characteristic illustrated in FIG. 6. In other words, the diffraction efficiency of the transmitted 1st-order diffracted light may remain virtually unchanged even when the AR coating 53 and the warp adjusting layer 54 are formed. More particularly, as illustrated in FIG. 6, in the range of 1525 nm to 1575 nm of the wavelength region used, the characteristic is satisfactory in that the diffraction efficiencies of the S-polarization indicated by the solid line and the P-polarization indicated by the dotted line are both 99% or higher, and the difference between the diffraction efficiencies of the S-polarization and the P-polarization is 0.5% or less. In addition, even when the range of the wavelength region is extended to 1500 nm to 1590 nm, the diffraction efficiencies of the S-polarization and the P-polarization are both 98% or higher. Hence, it may be regarded that the formed convex parts 52 are substantially unaffected by errors from the designed values, and that the tolerable manufacturing margin is large.

In addition, in the range of 1525 nm to 1575 nm of the wavelength region used, the diffraction efficiency of the reflected 1st-order diffracted light is 0.4% or less for both the S-polarization and the P-polarization, and is smaller than that of the incident light by two digits. When the light is incident to the transmitting diffraction element 50 from an oblique direction, a plane including an optical path of the incident light and a normal to the surface on which the convex parts 52 of the transmitting diffraction element 50 are formed may be defined as an incident plane. In this case, the polarized component oscillating in a direction perpendicular to the incident plane may be defined as the S-polarization, and the polarized component oscillating on the incident plane may be defined as the P-polarization.

As described above, the transmitting diffraction element 50 of this practical example 3 may have a small warp, a high diffraction efficiency and a low polarization dependence. In addition, because the convex parts 52 forming the diffraction grating may be formed by the 4-layer structure that is formed by alternately stacking two kinds of materials, the transmitting diffraction element 50 may be manufactured by a simple manufacturing process and the like.

COMPARISON EXAMPLE 1

Next, a description will be given of a transmitting diffraction element of a comparison example 1. A transmitting diffraction element 910 of this comparison example 1 has a cross sectional structure illustrated in FIG. 10. The diffraction grating is formed by forming convex parts 912 with a period of 1040 nm on a transparent substrate 911 that is formed with an AR coating 913. In the transmitting diffraction element 910 of this comparison example 1, light having a wavelength of 1525 nm to 1575 nm is incident at an angle of 48° with respect to a normal to the surface formed with the convex parts 912.

The convex parts 912 in this comparison example 1 has the 3-layer structure formed by a first layer 921, a second layer 922, and a third layer 923. More particularly, the convex part 912 in this comparison example 1 has the first layer 921 made of an intermediate refractive index material, SiON, having a refractive index of 1.7 and a thickness $d_{x1}$ of 290 nm, the second layer 922 made of a high refractive index material, $Ta_2O_5$, having a refractive index of 2.11 and a thickness $d_{x2}$ of 1130 nm, and the third layer 923 made of a low refractive index material, $SiO_2$, having the refractive index of 1.46 and a thickness $d_{x3}$ of 250 nm that are stacked on the transparent substrate 911 in this order as illustrated schematically in FIG. 11. The convex parts 912 that are formed have the trapezoidal cross section. Table 4 indicate shape parameters of the convex part 912 of this comparison example 1. In other words, in this comparison example 1, a height D of the convex part 912, which is a sum of the thicknesses of the first layer 921, the second layer 922, and the third layer 923, is 1670 nm, the taper angle is 3°, a length $X_b$ of the bottom side of the trapezoidal shape is 711.5 nm, and a length $X_t$ of the top side of the trapezoidal shape is 536.5 nm.

TABLE 4

| Substrate Side | | Comparison Example 1 |
|---|---|---|
| Thickness (nm) of First Layer (Intermediate Refractive Index Layer) | $d_{x1}$ | 290 |
| Thickness (nm) of Second Layer (High Refractive Index Layer) | $d_{x2}$ | 1130 |
| Thickness (nm) of Third Layer (Low Refractive Index Layer) | $d_{x3}$ | 250 |
| Height (nm) | D | 1670 |
| Taper Angle (°) | Ø | 3 |

TABLE 4-continued

| Substrate Side | | Comparison Example 1 |
|---|---|---|
| Length of Bottom Side | $X_b$ | 711.5 |
| Length of Top side | $X_t$ | 536.5 |

Figure 10:
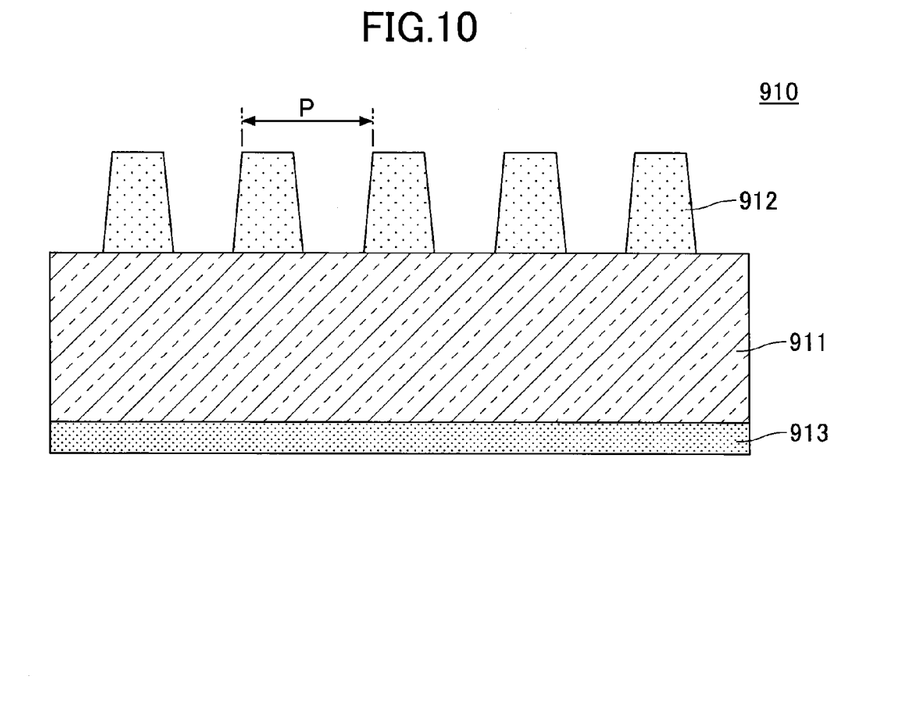
FIG. 10 is a cross sectional view schematically illustrating an example of a structure of a transmission diffraction element in a comparison example 1.
Figure 11:
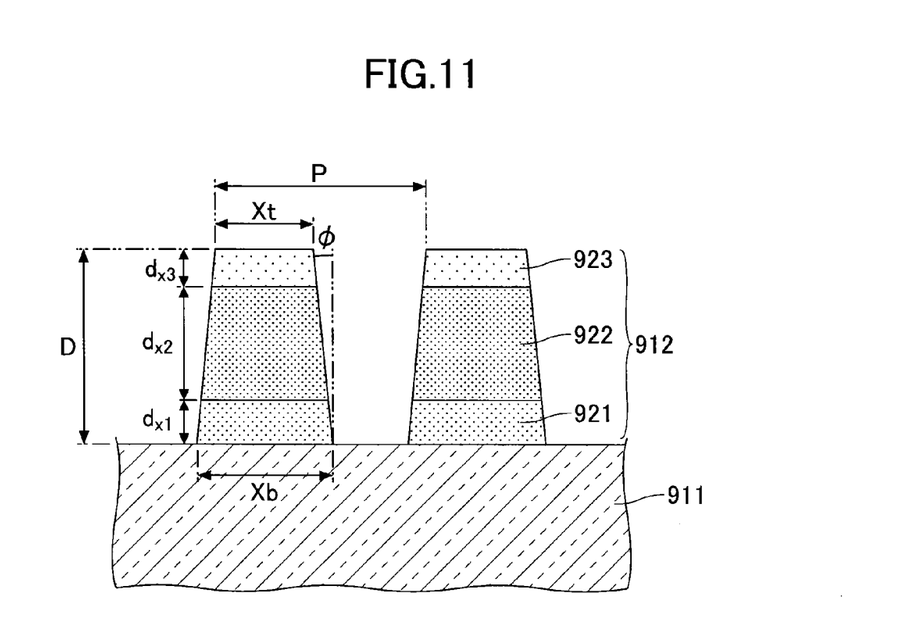
FIG. 11 is a cross sectional view schematically illustrating convex parts of the transmission diffraction element in the comparison example 1.

The transmitting diffraction element 910 of this comparison example 1 may be formed by processes similar to those used by the embodiments described above, except that the convex parts 912 have the 3-layer structure made of the first layer 921, the second layer 922, and the third layer 923 using three kinds of materials. However, because the convex parts 912 are formed by the three kinds of materials, a large-scale sputtering apparatus mounted with three or more targets may be required for the layer deposition, or processes need to be performed to replace the sputtering targets, which in turn may increase the manufacturing cost.

Figure 12:
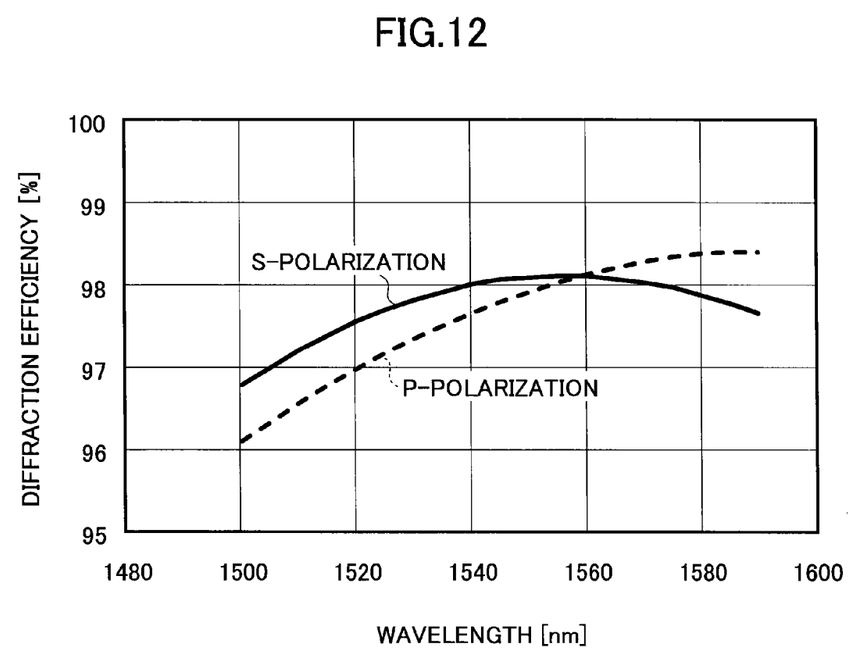
FIG. 12 is a diagram illustrating the diffraction efficiency of the transmission diffraction element of the comparison example 1.

FIG. 12 is a diagram illustrating the diffraction efficiency of the transmission diffraction element 910 of the comparison example 1. In FIG. 12, the abscissa indicates a wavelength of incident light, and the ordinate indicates the diffraction efficiency. In a range of 1525 nm to 1575 nm of the wavelength region used, a satisfactory characteristic is not obtained in that the diffraction efficiencies of one or both of the S-polarization indicated by a solid line and the P-polarization indicated by a dotted line is or are lower than 98%, and a difference between the diffraction efficiencies of the S-polarization and the P-polarization may be greater than 0.5%. In addition, when the range of the wavelength region is extended to 1500 nm to 1590 nm, the diffraction efficiencies of the S-polarization and the P-polarization deteriorate further, and the wavelength dependency deteriorates. Hence, it may be regarded that the formed convex parts 912 are affected by errors from the designed values, and that the tolerable manufacturing margin may be small.

In addition, in the range of 1525 nm to 1575 nm of the wavelength region used, the diffraction efficiency of the reflected 1st-order diffracted light is 0.4% or less for the S-polarization and is 1.5% or less for the P-polarization, which are larger than those for the practical examples 1 and 2 described above.

The embodiments and practical examples thereof described above may provide a transmitting diffraction element that may be manufactured at a low cost and with ease, and have a high diffraction efficiency and a low polarization dependence throughout the entire wavelength region of incident light.

Although the embodiments and practical examples thereof are numbered with, for example, "first," "second," or "third," the ordinal numbers do not imply priorities of the embodiments or practical examples thereof.

The present invention is described above in detail with reference to specific embodiments, however, it may be apparent to those skilled in the art that various variations and modifications may be made without departing from the spirit and scope of the present invention.

What is claimed is:

1. A transmitting diffraction element comprising:
a transparent substrate; and
a plurality of convex structures periodically formed on a surface of the transparent substrate,
wherein the plurality of convex structures comprises a first layer stacked on the transparent substrate, a second layer stacked on the first layer, a third layer stacked on the second layer, and a fourth layer stacked on the third layer, the first layer and the third layer are made of a first material having a refractive index, the second layer and the fourth layer are made of a second material having a refractive index that is lower than the refractive index of the first material, the third layer has a thickness that is largest amongst thicknesses of the first, second, third and fourth layers, and a diffraction efficiency of a transmitted first-order diffracted light is not less than 98% for p-polarization and s-polarization in a wavelength range of 1525-1575 nm or 1570-1610 nm when $(2\lambda/P-\sin\theta)>1$ is satisfied such that a transmitted second-order or higher diffracted light is not generated, where $\lambda$ is a wavelength of an incident light, P is a grating period of the plurality of convex structures, and $\theta$ is an incident angle of the incident light.

2. The transmitting diffraction element as claimed in claim 1, wherein the first material is at least one material selected from the group consisting of $Si_3N_4$, $TiO_2$, $Nb_2O_5$, and $Ta_2O_5$, and the second material is one material selected from the group consisting of $SiO_2$ and SiON.

3. The transmitting diffraction element as claimed in claim 1, wherein the refractive index of the first material is within a range of 1.9 to 2.3 in a wavelength region of the incident light, and the refractive index of the second material is within a range of 1.4 to 1.6 in a wavelength region of the incident light.

4. The transmitting diffraction element as claimed in claim 3, wherein a difference between the refractive index of the first material and a refractive index of the second material is 0.5 or greater.

5. The transmitting diffraction element as claimed in claim 1, wherein a difference between the refractive index of the first material and a refractive index of the second material is 0.5 or greater.

6. The transmitting diffraction element as claimed in claim 1, wherein the refractive index of the second material is 1.5 or less in a wavelength region of the incident light.

7. The transmitting diffraction element as claimed in claim 1, wherein a sum of the thicknesses of the first layer and the third layer is greater than a sum of the thicknesses of the second layer and the fourth layer.

8. The transmitting diffraction element as claimed in claim 1, further comprising:
an anti-reflection coating layer formed on a second surface of the transparent substrate on an opposite side to the surface.

9. The transmitting diffraction element as claimed in claim 8, wherein the anti-reflection coating layer comprises a plurality of layers each made of the first material and a plurality of layers each made of the second material in which the layers of the first and second materials are alternately stacked.

10. The transmitting diffraction element as claimed in claim 8, further comprising:
a warp adjusting layer formed between the transparent substrate and the convex structures,
wherein the warp adjusting layer is made of a material having a refractive index with a difference within ±0.1 with respect to a refractive index of the transparent substrate, and the warp adjusting layer has a thickness in a range of 0.5 to 1.5 times a thickness of the anti-reflection coating layer.

11. The transmitting diffraction element as claimed in claim 10, wherein the substrate is made of silica glass.

12. The transmitting diffraction element as claimed in claim 1, wherein a difference between the diffraction efficiency of a transmitted first-order diffracted light for p-polarization and the diffraction efficiency of a transmitted first-order diffracted light for s-polarization is not more than 0.5%.

13. The transmitting diffraction element as claimed in claim 1, wherein the diffraction efficiency of a transmitted first-order diffracted light is not less than 98% for p-polarization and s-polarization in a wavelength range of 1500-1590 nm or 1545-1635 nm, when $(2\lambda/P-\sin\theta)>1$ is satisfied such that the transmitted second-order or higher diffracted light is not generated.

14. The transmitting diffraction element as claimed in claim 1, wherein the diffraction efficiency of a transmitted first-order diffracted light is not less than 99% for p-polarization and s-polarization in a wavelength range of 1525-1575 nm, when $(2\lambda/P-\sin\theta)>1$ is satisfied such that the transmitted second-order or higher diffracted light is not generated.

15. The transmitting diffraction element as claimed in claim 1, wherein the plurality of convex structures is formed on the surface of the transparent substrate such that the first layer of the convex structures is in contact with the transparent substrate.

16. The transmitting diffraction element as claimed in claim 1, wherein each of the convex structures has a four-layer structure consisting of the first layer, the second layer, the third layer and the fourth layer.

17. The transmitting diffraction element as claimed in claim 1, wherein each of the convex structures has a cross section in a plane perpendicular to the substrate, and the cross section has a trapezoidal shape.

18. The transmitting diffraction element as claimed in claim 17, wherein an angle between a tapered side of the trapezoidal shape and a line perpendicular to the substrate is 3°.

19. The transmitting diffraction element as claimed in claim 1, wherein the substrate is made of silica glass.

20. The transmitting diffraction element as claimed in claim 1, wherein the diffraction efficiency of a transmitted first-order diffracted light is not less than 98.5% for p-polarization and s-polarization in a wavelength range of 1570-1610 nm, when $(2\lambda/P-\sin\theta)>1$ is satisfied such that the transmitted second-order or higher diffracted light is not generated.

* * * * *